(12) United States Patent
Chen

(10) Patent No.: US 8,342,832 B2
(45) Date of Patent: Jan. 1, 2013

(54) MOLD FOR SHAPING BASEBALL OR SOFTBALL COVER

(76) Inventor: Shyi-Ming Chen, Kaohsiung (TW)

( * ) Notice: Subject to any disclaimer, the term of this patent is extended or adjusted under 35 U.S.C. 154(b) by 58 days.

(21) Appl. No.: 13/188,676

(22) Filed: Jul. 22, 2011

(65) Prior Publication Data

US 2012/0244247 A1    Sep. 27, 2012

(30) Foreign Application Priority Data

Mar. 25, 2011   (CN) ...................... 2011 2 0083066 U

(51) Int. Cl.
*B29C 45/16* (2006.01)
(52) U.S. Cl. ...................... 425/112; 425/127; 425/129.1
(58) Field of Classification Search .................. 425/112, 425/127, 129.1
See application file for complete search history.

(56) References Cited

U.S. PATENT DOCUMENTS

| | | | | |
|---|---|---|---|---|
| 2,645,487 A | * | 7/1953 | Hawes ........................... | 473/601 |
| 2,938,237 A | * | 5/1960 | Kern et al. ..................... | 264/163 |
| 4,256,304 A | * | 3/1981 | Smith et al. ................... | 473/451 |
| 4,498,667 A | * | 2/1985 | Tomar ........................... | 473/600 |
| 4,729,566 A | * | 3/1988 | Molitor ......................... | 473/600 |
| 4,808,272 A | * | 2/1989 | Molitor ........................... | 205/70 |
| 4,822,041 A | * | 4/1989 | Molitor ........................... | 473/597 |

* cited by examiner

*Primary Examiner* — Tim Heitbrink
(74) *Attorney, Agent, or Firm* — Chun-Ming Shih

(57) ABSTRACT

A ball cover shaping mold of a baseball or softball is constructed from two corresponding figure of 8 shaped mold pieces. These two mold pieces fit together to form a mold of the outside of the ball cover of a softball or baseball, and these two mold pieces are constructed from a soft material. Where these two mold pieces join are the seams, and on the inside side of the seams, grooves are set to form the raised sewn section on the ball cover, and an material inlet and an air outlet is situated where these two pieces join. PU material is used in the mold to construct the ball cover. The soft mold pieces are easy to remove and moreover, the grooves set on the inside seams of the figure of 8 shaped mold pieces form the raised sewn section on the outside of the ball cover where the two mold pieces join, thereby fulfilling the required outside appearance of the ball. The raised sewn section is situated along the mold lines, eliminating the need to further repair and trim the ball to achieve the required outside appearance of the ball, this structure of the mold being simple, and meticulously designed, therefore allowing for easy formation of the ball cover, and additional work procedures are simplified, hugely increasing the production rate of baseballs and softballs, and thereby raising the competitiveness of the product on the market.

2 Claims, 5 Drawing Sheets

MOLD FOR SHAPING BASEBALL OR SOFTBALL COVER

BACKGROUND OF THE INVENTION

1. Field of the invention

The present invention relates to a mold of a ball, in particular, to a mold for shaping a baseball or softball cover.

2. Description of Related Art

Currently in the construction of formal competition baseballs and softballs, the main part is the ball core, having elastic-like characteristics, and the ball cover which is constructed from an inner core covered by an outer leather cover. As shown in FIG. 1, the ball cover is made from two figure of 8 shaped covers (A) which cover the ball core (B) at the seams to form the ball shape, and where the ball covers join at the seams there is the raised sewn section, this raised sewn section being an essential part of a softball or baseball's appearance, this sewn section usually being hand-sewn which requires a high operational ability. In the current market where worker costs continue to rise, this inevitably leads to higher production costs. Additionally, the source of leather for the leather ball covers is limited and the cost of leather is increasing, making it difficult to lower production costs and therefore difficult to increase competitiveness in the market for this product. Furthermore, during the use of the ball, where the ball covers are sewn together at the seams and cover the ball core, the ball is vulnerable to the environment, for example, when the weather is humid or rainy moisture or water enters through these seams and soaks the ball core. This soaking of the core results in a heavier ball, leading to a loosening of the ball core and a shape change which influences the elasticity and properties of the ball. There is therefore, an inability to ensure the original physical characteristics of the ball, thereby hugely shortening the lifespan of the ball. For the abovementioned reasons, PU material is conveniently used as the ball cover, as shown in FIG. 2 and FIG. 3, more specifically, two opposing semi circular shaped molds 1', 2' fit together to form the ball cover of the ball core, this process resulting in mechanized production of the ball to reduce worker and production costs, and the PU replacing leather to reduce material costs, and at the same time producing a tighter fitting ball which doesn't allow water to enter. But because of the shape of the semi circular shaped molds, after production a line 3' will appear where the molds join, which still requires a worker to trim the ball and therefore the manufacturing process still has drawbacks.

SUMMARY OF THE INVENTION

The goal of this invention is to provide a way to further decrease the production costs of a baseball or softball, allowing for easier additional work procedures, and even eliminating the need for additional work to achieve the required outside appearance of the ball cover of a softball or baseball by using a ball cover shaping mold.

To achieve the above goal, this invention uses a kind of softball or baseball ball cover shaping mold, constructed from two corresponding figure of 8 shaped mold pieces, wherein these two mold pieces fit together to form a mold of the ball cover of a softball or baseball, and these two mold pieces are constructed from a soft material, and where these two mold pieces join are the joining edges, and on the inside side of the joining edges, grooves are set to form the raised sewn section on the ball cover, and an material inlet and an air outlet is situated where these two mold pieces join.

Protruding supports to position the ball core are distributed along the interior surface of the joining edges of the above described two mold pieces.

In utilizing the above method, PU material is used in the mold of this invention to construct the ball cover, the two mold pieces fit together at the seams to form a complete ball cover and ball core, the soft mold pieces are easy to remove, and moreover, the grooves set on the inside seams of the figure of 8 shaped parts form the raised sewn section on the two ball covers, thereby fulfilling the required outside appearance of the ball, the join lines of the mold are situated along the raised sewn section of the ball, eliminating the need to further repair and trim the ball to achieve the required outside appearance of the ball, the structure of the complete mold being simple, and meticulously designed, therefore allowing for easy formation of the ball cover, and additional work procedures are simplified, hugely increasing the production rate of baseballs and softballs, and thereby raising the competitiveness of the product on the market.

The invention, as well as its many advantages, may be further understood by the following detailed description and drawings in which:

DETAILED DESCRIPTION OF THE INVENTION

Figure 1:
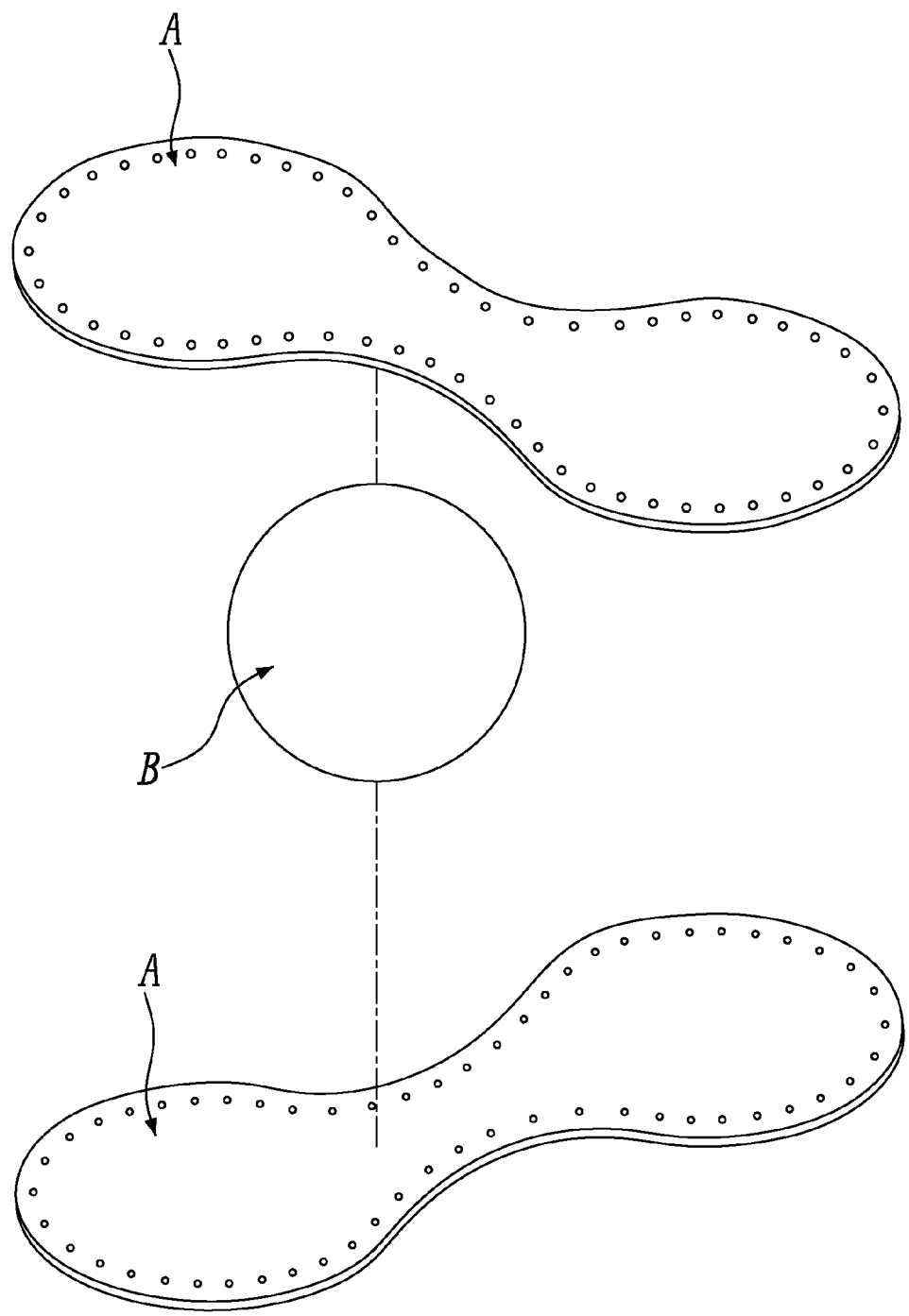
FIG. 1 is an exploded perspective view of a conventional baseball or softball.
Figure 2:
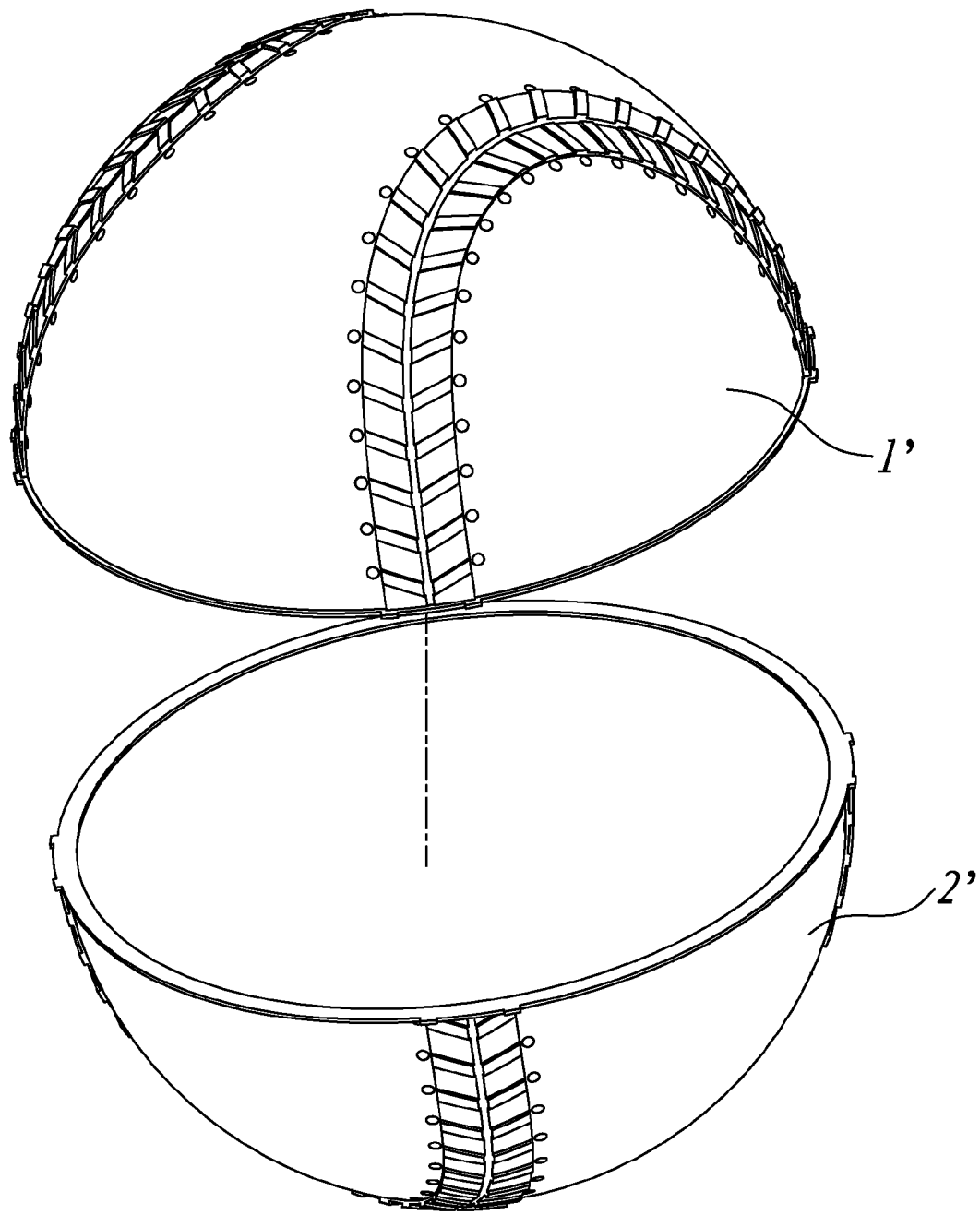
FIG. 2 is a schematic diagram showing a ball cover shaping mold of a conventional baseball or softball.
Figure 3:
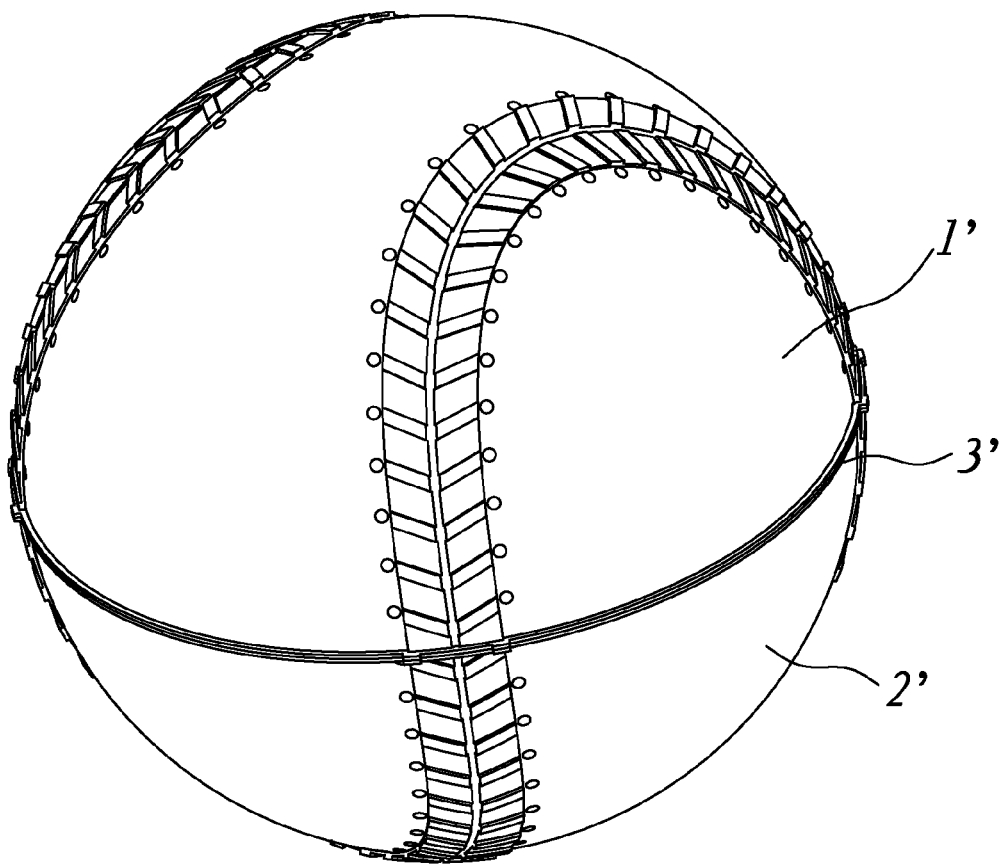
FIG. 3 is a schematic diagram showing the embodiment of a ball cover shaping mold of a conventional baseball or softball.
Figure 4:
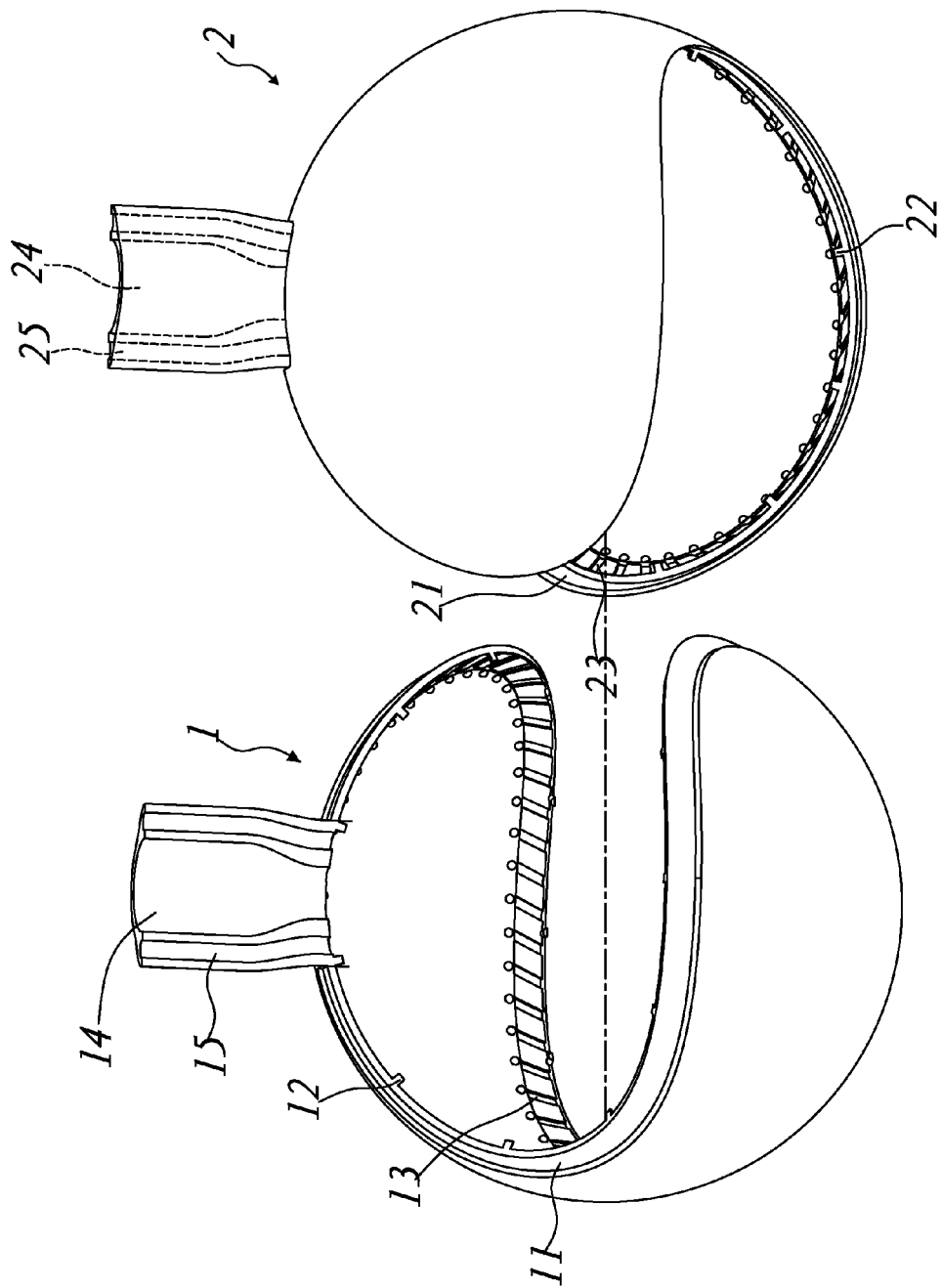
FIG. 4 is a schematic diagram showing the structure of a ball cover shaping mold of the present invention.
Figure 5:
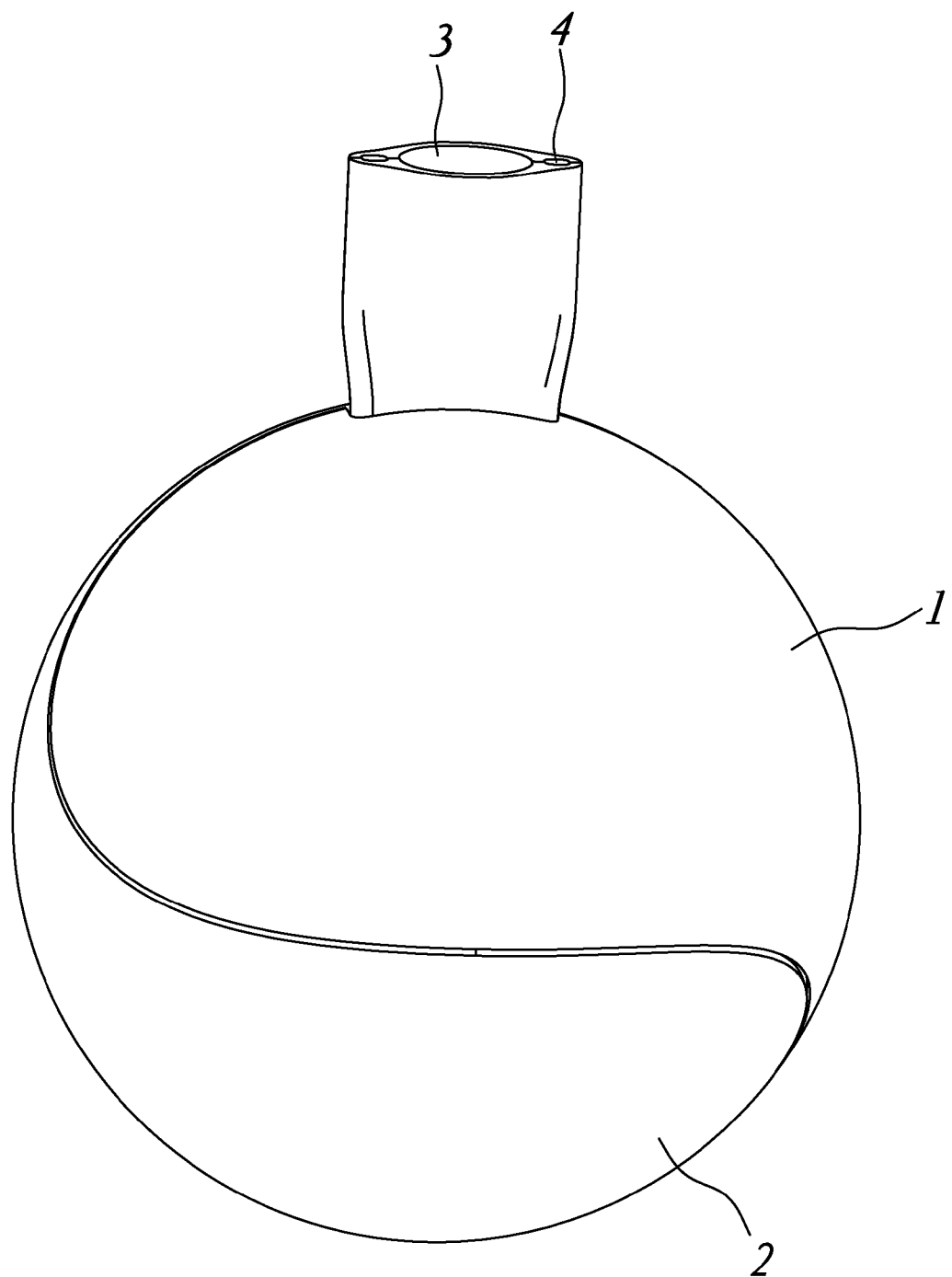
FIG. 5 is a schematic diagram showing the embodiment of a ball cover shaping mold of the present invention.

As shown in FIG. 4 and FIG. 5, this invention discloses a kind of baseball or softball shaping mold, this mold constructed from two corresponding figure of 8 shaped soft mold pieces 1, 2, these two mold pieces 1, 2 fitting together to form the outside shape of a ball cover, these mold pieces 1, 2 having increased changeable properties, for example they can be made from rubber, silicone or soft resin, and so on. The mold piece 1 and mold piece 2 having joining edges 11, and positioning protruding supports 12 set on the joining edges 11 on the interior surface of the mold, to support and cover the ball core so as to achieve control over the thickness of the ball cover; the inside sides on the interior surface of the joining edges 11 having grooves 13 set to form the raised sewn section on the ball cover; on the joining edge 11 of mold piece 1 a protrusion is set having a material inlet groove 14 which connects to the inside side of mold piece 1, and on two sides of material inlet groove 14 are air outlet grooves 15, which also connect to the inside side of the mold piece; on the inside side of the boundary of this mold piece 2 a joining edge 21 is formed which is matched with joining edge 11 on mold piece 1, and joining edge 21 exactly corresponds with joining edge 11 on mold piece 1 so that when joining edge 11 and joining edge 21 fit together they form the same thickness as the interior surface of the mold, similarly on joining edge 21 on the interior surface of the mold piece positioning protruding supports 22 are positioned, to support and cover the ball core; on the interior surface of joining edge 21 and on the inside side grooves 23 are set which form the raised sewn section on the ball cover; on joining edge 21 of mold piece 2 and corresponding to the above mentioned material inlet groove 14 and protrusion is material inlet groove 24 which connects to the inside side of mold piece 2, and on two sides of material inlet groove 24 are air outlet grooves 25, which also connect to the inside side of the mold piece 2. As shown in FIG. 4, mold pieces 1,2 fit together and form a complete ball cover and ball cavity, at the same time material inlet grooves 14 and 24 correspond to form material inlet 3, and the two sets of air outlet grooves 15 and 25 correspond to form air outlets 4 on two sides of material inlet 3. Ball cover forming material is injected through material inlet 3 to the inside of the formed cavity, air is then expelled through air outlets 4, allowing the ball cover to form on the ball core thereby producing a complete ball, after removing the mold, the join lines are situated along the formed raised section, eliminating the need to trim the ball so as to achieve the required outside appearance of the ball, only being necessary to trim the ball around the material inlet 3 and air outlets 4, this mold for shaping having a simple structure, meticulously designed, allowing the ball cover to form easily, and with simplified additional work procedures, greatly increasing the production rate of softballs and baseballs and raising the competitiveness of the product on the market.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A mold for shaping a ball cover of a baseball or softball, characterized in that: the mold is constructed from two corresponding figure 8 shaped mold pieces, the two mold pieces fitting onto each other to form an outside shape of the ball cover, and the two mold pieces being constructed from a soft material, where the two mold pieces join are joining edges, and on an inside side of the joining edges on an interior surface of the two mold pieces, grooves are set to form a raised sewn section on the ball cover, and a material inlet and an air outlet are situated where the two mold pieces join.

2. The mold for shaping a ball cover of a baseball and softball of claim 1, characterized in that: protruding supports to position a ball core are distributed along the interior surface of the joining edges of the two mold pieces.

* * * * *